United States Patent [19]

Sato

[11] Patent Number: 5,310,389
[45] Date of Patent: May 10, 1994

[54] PARALLEL-AXIS DIFFERENTIAL GEAR TOOTH MODIFICATION

[75] Inventor: Hideyuki Sato, Tsurugashima, Japan

[73] Assignee: Zexel-Gleason USA, Inc., Rochester, N.Y.

[21] Appl. No.: 977,651

[22] Filed: Nov. 17, 1992

[51] Int. Cl.$^5$ .......................... F16H 1/32; F16H 55/08
[52] U.S. Cl. ........................................ 475/252; 74/462
[58] Field of Search ................... 74/462; 475/159, 160, 475/344, 252

[56] References Cited

U.S. PATENT DOCUMENTS

| | | | |
|---|---|---|---|
| 2,269,734 | 1/1942 | Powell | 475/252 |
| 3,706,239 | 12/1972 | Myers | 475/226 |
| 3,738,192 | 6/1973 | Belansky | 475/249 |
| 4,365,524 | 12/1982 | Dissett et al. | 475/226 |
| 4,593,679 | 6/1986 | Collins | 74/462 X |
| 4,942,781 | 7/1990 | Hori | 475/344 X |
| 5,122,101 | 6/1992 | Tseng | 475/252 |
| 5,163,826 | 11/1992 | Cozens | 74/462 X |

OTHER PUBLICATIONS

Shigley, *Mechanical Engineering Design*, 3rd Edition, 1977, pp. 448-449.

*Primary Examiner*—Leslie A. Braun
*Assistant Examiner*—Khoi Ta
*Attorney, Agent, or Firm*—Eugene Stephens & Associates

[57] ABSTRACT

A parallel-axis gear differential includes pairs of element gears (34) mounted within pockets (36) formed in a differential housing (10). Each element gear includes a first gear section (38) for meshing with one of two side gears (30 or 32), a second gear section (40) for meshing with the first gear section of its mating element gear, and a stem section (42) for interconnecting the first two gear sections. Associated with each pair of pockets are two passageways (44, 46) for providing respective paths for the flow of lubrication fluid between the exterior of the housing and the respective meshing gear sections (38, 40) of each pair of element gears (34). The profile of the teeth of the element gears is modified with a chamfer-like shape (58) at the intersection of the profile and the top lands of the teeth, the chamfer-like shape making an angle of 10°-30° with the top lands.

1 Claim, 2 Drawing Sheets

PARALLEL-AXIS DIFFERENTIAL GEAR TOOTH MODIFICATION

TECHNICAL FIELD

The invention relates to automotive differentials of the "parallel-axis" type, and, more particularly, to the lubrication of the differential's planetary gear arrangements that are mounted in pockets formed in the differential housing.

BACKGROUND

Gear differentials include compound planetary gear sets carried within a differential housing interconnecting a pair of output shafts for opposite directions of rotation with respect to the housing. An input shaft is connected to the housing for rotating the housing about a common axis of the output shafts. Sun gear members of the respective planetary gear sets, also referred to as "side" gears, are coupled to inner ends of the output shafts. Planet gear members of the planetary gear sets, also referred to as "element" gears, operatively connect the two side gears for relative rotation in a mutual driving relationship.

One known arrangement of the planetary gearing positions the side and element gears within the housing for rotation about axes that extend parallel to each other. Differentials with this type of gearing arrangement are referred to as "parallel-axis" gear differentials. The element gears of this type of differential are generally mounted in pairs within the differential housing. Preferably, the element and side gears are provided with helical teeth; and one portion of each element gear meshes with one of the side gears, while another portion of each element gear meshes with its paired element gear.

The invention herein relates to known designs of parallel-axis differentials in which the element gears are individually supported for rotation within pockets formed in the housings. The pockets provide bearings for slidably supporting the outside cylindrical surfaces of the element gears including the top lands of the element gear teeth. While such pocket designs have many important advantages, the relatively tight tolerances between the pockets supporting the element gears and the outer cylindrical surfaces of the element gears leave little room for the circulation of lubricant.

SUMMARY OF THE INVENTION

This invention is related to a second invention disclosed in a commonly-assigned U.S. patent application Ser. No. 07/977,648 entitled "Lubrication Modification for Parallel-Axis Differential" filed in the name of Hideyasu Takefuta on even date herewith, the disclosure of which is hereby incorporated by reference. Both inventions improve parallel-axis gear differentials by facilitating the flow of lubricating oil between the element gears and their respective pockets.

My invention accomplishes such lubrication improvement by providing a simple modification to the tooth shape of the element gears. According to the invention, the profile of the helical teeth of the element gears is modified with a chamfer-like shape at the intersection of the profile and the top lands of the teeth, the chamfer-like shape making an angle of 10°–30° with the top lands.

In a preferred embodiment of the invention, the differential housing is provided with passageways between the exterior of the housing and each pair of pockets for providing a path for lubricating fluid. One such passageway is positioned in proximity to each of the meshing areas shared by each pair of element gears.

DRAWINGS

DETAILED DESCRIPTION

Figure 1:
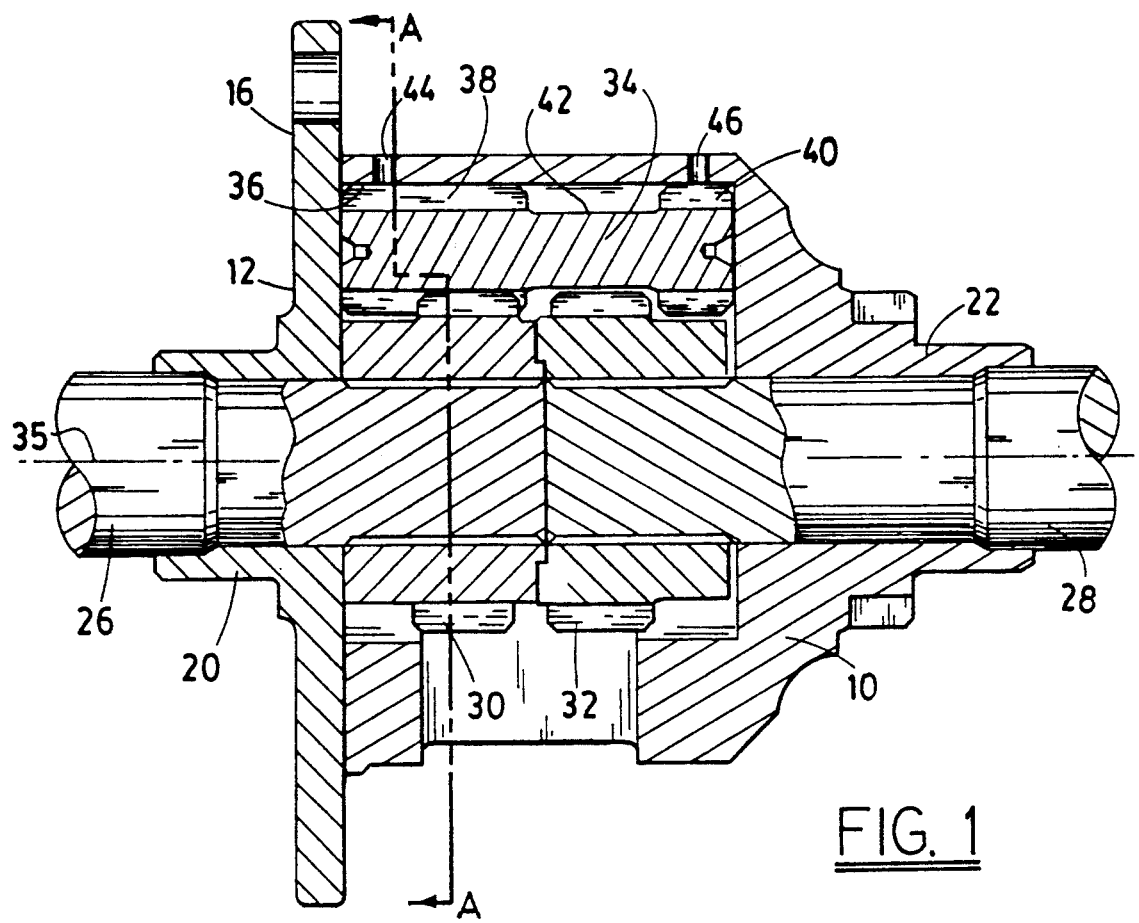
FIG. 1 is a longitudinal sectional view of a parallel-axis gear differential modified according to a preferred embodiment of my invention.
Figure 2:
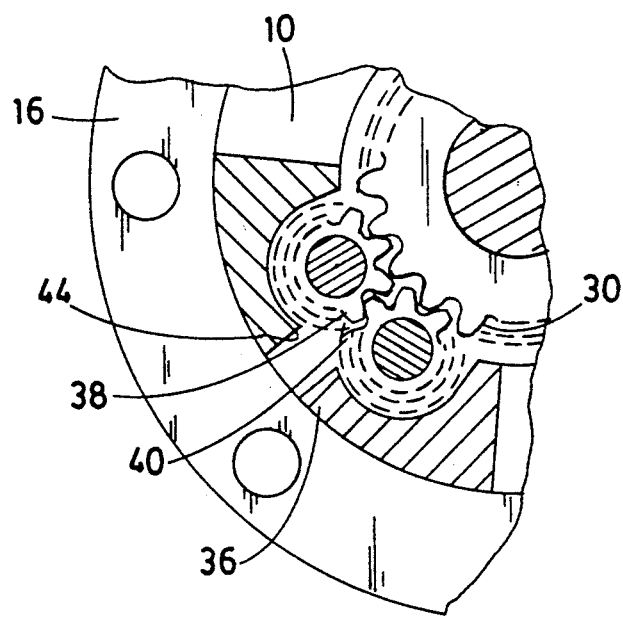
FIG. 2 is a schematic partial sectional view of the housing shown in FIG. 1, taken along the plane A—A, showing a pair of element gears in mesh with each other and showing one of the pair of element gears in mesh with a respective one of the side gears.

In the preferred embodiment illustrated in FIGS. 1 and 2, my differential is assembled from two housing portions 10 and 12 that are held together by bolts. A flange 16 is formed integrally with housing portion 12 for mounting a ring gear (not shown). Bearings are mounted within respective trunnions 20 and 22 to support the housing for rotation about axle shafts 26 and 28.

A planetary gear arrangement is carried in housing 10, namely, side gears 30 and 32 are splined to the respective inner ends of axle shafts 26 and 28 for rotation about a common axis 35. Combination gears 34 are mounted in respective pairs of pockets 36 that are evenly distributed about the periphery of the side gears. Each element gear 34 is positioned for rotation about an axis parallel to common axis 35, and each includes a first gear section 38 for meshing with one of the side gears, a second gear section 40 for meshing with the first gear section 38 of its paired element gear, and a stem section 42 for interconnecting the two gear sections 38 and 40.

A plurality of passageways 44, 46 are formed through housing portion 10 to provide respective paths for the flow of lubrication fluid between the exterior of the housing and the pairs of pockets 36. Passageways 44, 46 are positioned in proximity to respective meshing gear sections 38, 40 of each pair of element gears 34.

Figure 3A:
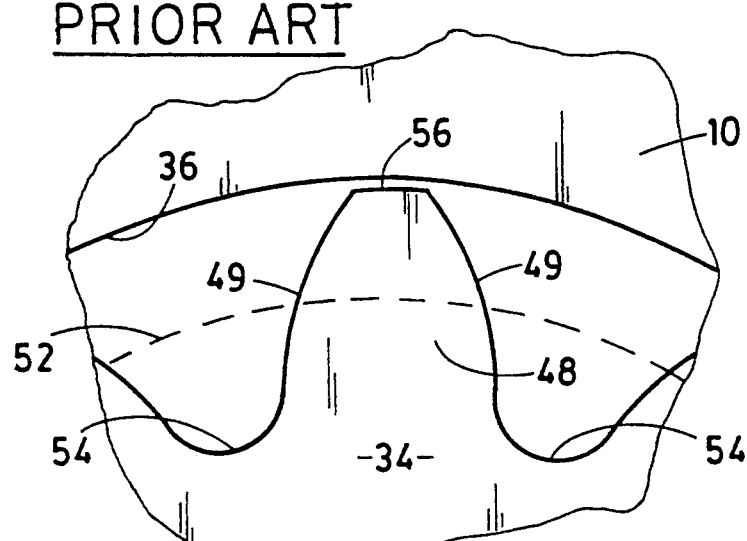
FIGS. 3A and 3B are schematic views of the profiles of a tooth of one of the element gears within its respective housing pocket, FIG. 3A showing the tooth with its predetermined profile according to a known prior art design, and FIG. 3B showing the profile of the tooth modified according to the invention.
Figure 3B:
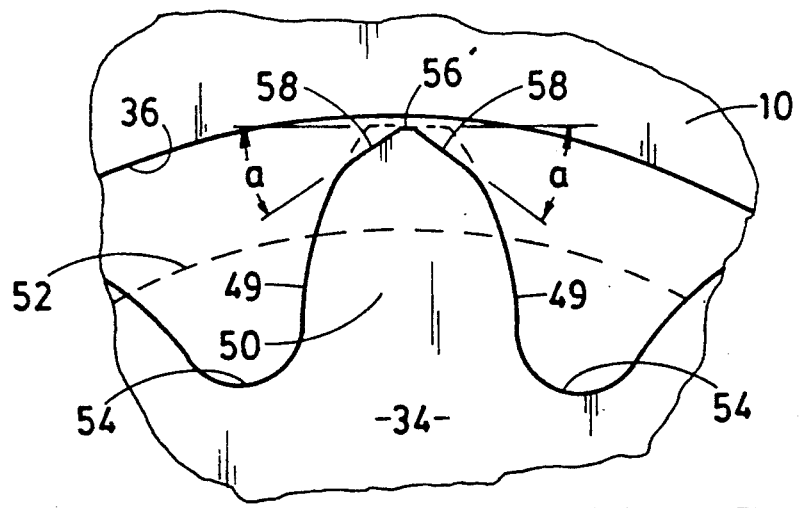

Referring to FIGS. 3A and 3B, the profiles of a tooth of an element gear 34 are shown schematically in a representation that includes a respective pocket 36 of housing portion 10, as well as the pitch line 52 of the gear. In FIG. 3A, tooth 48 is shown with a known profile 49 between its root 54 and its relatively broad top land 56. In contrast, FIG. 3B shows a tooth 50 which is modified according to my invention. Namely, on each face of gear tooth 50, a chamfer-like form 58 has been provided at the intersection between its profile 49 and its top land 56'. Chamfer-like form 58 makes an angle $\alpha$ of 10°–30° with top land 56$\alpha$. This modification substantially reduces the width of top land 56, relative to the width of prior art top land 56 and, at the same time, enlarges the area in which lubricating fluid can be carried by tooth 50, thereby permitting much more lubricating fluid to flow around the area between its narrowed top land 56' and pocket 36.

The term "chamfer-like" has been used to describe form 58 in order to distinguish this modification from a "crowning-like" form. That is, as different from conventional crowning, which would begin at pitch line 52, form 58 is limited to the uppermost portions of profile 49.

The just-described lubrication improvement, provided by the modification of the profile of the helical teeth of the element gears 34, is further facilitated in the illustrated preferred embodiment by passageways 44, 46 described above.

I claim:

1. In a differential assembly having:
 a differential housing;
 a pair of side gears positioned in said housing for receiving a pair of respective axle ends for rotation therewith about a common axis;
 at least one pair of planetary element gears positioned in said housing operatively connecting said pair of side gears in a mutual driving relationship, each respective element gear in each pair being in meshing engagement with both a respective one of said side gears and with its paired element gear;
 at least one pair of pockets formed in said housing supporting said element gears for rotation about respective axes that extend parallel to said common axis of said side gears; and
 said gear sections of said element gears having helical teeth with a predetermined profile between the roots and toplands of said teeth;
 the improvement wherein:
 said predetermined profile of the helical teeth of said element gears is modified with a chamfer-like form at the intersection of said profile and said toplands, said chamfer-like shape making an angle ranging between 10°–30° with said toplands;
 said housing further comprises at least one passageway between the exterior of said housing and each said pair of pockets for providing a path for lubricating fluid; and each said passageway is positioned in proximity to one of the meshing areas shared by each said pair of element gears.

* * * * *